:::
United States Patent Office 2,706,716
Patented Apr. 19, 1955

2,706,716

HEAT STORAGE MATERIAL

John P. Howe, Round Lake, and Richard R. Katucki, Schenectady, N. Y., assignors to General Electric Company, a corporation of New York No Drawing. Application December 30, 1952,
Serial No. 328,820

5 Claims. (Cl. 252—70)

This invention relates to heat storage materials particularly of the type serving as a heat reservoir from which heat may be drawn as needed for space heating. Such heat reservoirs are important in heat pump installations and solar heating arrangements.

A heat storage reservoir consists of a well-insulated tank containing a fluid circulating coil on the interior thereof surrounded by a heat storage material. The nature of the heat storage material depends upon the service requirements to be met. In many cases water is a satisfactory heat storage material. However, for space heating purposes the heat content of liquid water is insufficient and the melting point of water is too low to make use of the heat of fusion. For space heating purposes certain salt hydrates having melting points within the range of 95° F. to 130° F. are more satisfactory than water. Disodium phosphate dodecahydrate is one example of such a salt hydrate. Another is calcium nitrate tetrahydrate. The latter salt hydrate has a melting temperature of 109° F., a heat of fusion of 61 B. t. u.'s per lb. and melts congruently thus avoiding the segregation of the material into two or more phases. These characteristics make it highly desirable for use as a heat storage material. However, its use for this purpose has been very restricted due to the fact that it undercools or supercools to such a degree that it is still liquid at a temperature considerably below 109° F.

It is an object of this invention to provide a heat storage material containing calcium nitrate tetrahydrate and an additive which will prevent undercooling of the calcium nitrate tetrahydrate.

It is another object of this invention to provide a heat storage material containing calcium nitrate tetrahydrate and a nucleating agent to promote crystallization of the hydrate.

Briefly stated, in accordance with one of its aspects, this invention is directed to a heat storage material comprising calcium nitrate tetrahydrate containing a nucleating agent selected from the group consisting of barium hydroxide octahydrate, cadmium hydroxide, sodium hydroxide, potassium hydroxide, and strontium hydroxide, the nucleating agent being present in crystalline form at a temperature above the melting point of calcium nitrate tetrahydrate.

We have discovered that calcium nitrate tetrahydrate is a satisfactory heat storage material which will not undercool to a serious degree provided a nucleating agent from the group of hydroxides mentioned above is incorporated therein. The nucleating agent must be present in crystalline form at the melting point of the calcium nitrate tetrahydrate. This may be insured by saturating the calcium nitrate tetrahydrate with the hydroxide at a temperature slightly above the melting temperature of the hydrate. For example, if the hydrate is saturated with the hydroxide at a temperature of about 115° F. the hydroxide will be present in crystalline form at the 109° F. melting point of the hydrate. It should be emphasized that no harm is done by having a considerable excess of the hydroxide present over and above that necessary to achieve saturation. However, no benefit is conferred by having such an excess and the hydroxides are considerably more costly than calcium nitrate tetrahydrate.

Of the hydroxides listed above we prefer to use barium hydroxide octahydrate as the additive. Satisfactory nucleation of calcium nitrate tetrahydrate may be achieved by having barium hydroxide octahydrate present to the extent of about 5% by weight. The hydroxide crystals in liquid hydrate form nuclei which readily promote crystallization of the calcium nitrate tetrahydrate as soon as the hot solution is cooled to 109° F. The solution will then maintain this temperature until all of the heat storage material has crystallized.

On occasions, the melt will undercool somewhat before crystallization begins. However, the melt has never stayed liquid below 95° F. where the additives of this invention were present. This undercooling is not serious and after crystallization begins the temperature rises to the 109° melting point and holds this temperature until solidification is essentially complete. Subsequent remelting does not adversely affect the nucleating agent.

While the present invention has been described with reference to particular embodiments thereof, it will be understood that numerous modifications may be made by those skilled in the art without actually departing from the invention. Therefore, we aim in the appended claims to cover all such equivalent variations as come within the true spirit and scope of the foregoing disclosure.

What we claim as new and desire to secure by Letters Patent of the United States is:

1. A heat storage material consisting essentially of the tetrahydrate of calcium nitrate containing a nucleating agent selected from the group consisting of barium hydroxide octahydrate, cadmium hydroxide, sodium hydroxide, potassium hydroxide and strontium hydroxide, the said nucleating agent being present in sufficient quantity to saturate said calcium nitrate tetrahydrate at a temperature above the melting point thereof.

2. A heat storage material consisting essentially of calcium nitrate tetrahydrate and a nucleating agent selected from the group consisting of barium hydroxide octahydrate, cadmium hydroxide, sodium hydroxide, potassium hydroxide and strontium hydroxide incorporated therein, said nucleating agent being present in sufficient quantity to saturate said calcium nitrate tetrahydrate at a temperature about 115° F.

3. A heat storage material consisting essentially of calcium nitrate tetrahydrate containing about 5%, by weight, barium hydroxide octahydrate in crystalline form as a nucleating agent.

4. A heat storage material consisting essentially of calcium nitrate tetrahydrate and barium hydroxide octahydrate incorporated therein in sufficient quantity to saturate said calcium nitrate tetrahydrate at a temperature above the melting point thereof.

5. A heat storage material consisting essentially of calcium nitrate tetrahydrate having incorporated therein a quantity of barium hydroxide octahydrate sufficient to saturate said calcium nitrate tetrahydrate at a temperature about 115° F.

References Cited in the file of this patent

UNITED STATES PATENTS

| | | |
|---|---|---|
| 1,787,078 | Little | Dec. 30, 1930 |
| 1,887,618 | Bell | Nov. 15, 1932 |
| 2,595,905 | Telkes | May 6, 1952 |